United States Patent
Mandula et al.

(10) Patent No.: US 12,458,997 B2
(45) Date of Patent: Nov. 4, 2025

(54) APPLICATION OF NON-STICK COATINGS ONTO JAWS OF ELECTROSURGICAL TISSUE SEALING INSTRUMENTS

(71) Applicant: Covidien LP, Mansfield, MA (US)

(72) Inventors: Rajanikanth Mandula, Hyderabad (IN); Naveen Kanth Nelli, Ambajipeta (IN); Ravi Sekhar Gutti, Hyderabad (IN); Bhargav Sarma Yellayi, Hyderabad, IN (US)

(73) Assignee: Covidien LP, Mansfield, MA (US)

( * ) Notice: Subject to any disclaimer, the term of this patent is extended or adjusted under 35 U.S.C. 154(b) by 131 days.

(21) Appl. No.: 17/991,266

(22) Filed: Nov. 21, 2022

(65) Prior Publication Data

US 2024/0165649 A1 May 23, 2024

(51) Int. Cl.
| | |
|---|---|
| *B05C 1/02* | (2006.01) |
| *A61B 18/14* | (2006.01) |
| *C09D 5/00* | (2006.01) |
| *C09D 183/04* | (2006.01) |
| *A61B 17/00* | (2006.01) |
| *A61B 18/00* | (2006.01) |

(52) U.S. Cl.
CPC .......... *B05C 1/027* (2013.01); *A61B 18/1442* (2013.01); *A61B 18/1445* (2013.01); *C09D 5/00* (2013.01); *C09D 183/04* (2013.01); *A61B 2017/00526* (2013.01); *A61B 2018/0013* (2013.01)

(58) Field of Classification Search
USPC ................................................ 118/264–271
See application file for complete search history.

(56) References Cited

U.S. PATENT DOCUMENTS

| | | |
|---|---|---|
| 3,729,007 A | 4/1973 | Mirkovitch |
| 4,100,113 A | 7/1978 | McCain |
| 4,348,426 A | 9/1982 | Blenner et al. |
| (Continued) | | |

FOREIGN PATENT DOCUMENTS

| | | | |
|---|---|---|---|
| CN | 207285568 U | * | 5/2018 |
| CN | 111955899 A | * | 11/2020 |
| (Continued) | | | |

OTHER PUBLICATIONS

English Translation CN-111955899A (Year: 2020).*
English Translation CN-207285568U (Year: 2018).*
English Translation KR-101697283 B1 (Year: 2017).*

*Primary Examiner* — Yewebdar T Tadesse

(57) ABSTRACT

A coating assembly for coating jaws of an electrosurgical instrument includes a dispensing device and a jaw applicator. The dispensing device has a non-stick coating material contained therein and includes a discharge port. The jaw applicator includes an applicator body defining a cavity therein. The applicator body includes a first wall and a second wall disposed in spaced relation relative to each other and the cavity extends therebetween. Each of the first and second walls has openings defined therethrough that are in open communication with the cavity. The discharge port of the dispensing device is configured to engage the jaw applicator in a fluid tight manner to define a flow path for the non-stick coating material that extends out of the discharge port, into the cavity of the applicator body, and out of the openings defined in the first and second walls.

17 Claims, 12 Drawing Sheets

(56) References Cited

U.S. PATENT DOCUMENTS

| | | |
|---|---|---|
| 4,396,450 A | 8/1983 | Blenner et al. |
| 4,492,231 A | 1/1985 | Auth |
| 4,714,650 A | 12/1987 | Obayashi et al. |
| 5,201,900 A | 4/1993 | Nardella |
| 5,211,993 A | 5/1993 | Kolesinski |
| 5,213,928 A | 5/1993 | Yu |
| 5,484,436 A | 1/1996 | Eggers et al. |
| 5,549,604 A | 8/1996 | Sutcu et al. |
| 5,702,387 A | 12/1997 | Arts et al. |
| 5,713,895 A | 2/1998 | Lontine et al. |
| 5,773,098 A | 6/1998 | Thomas |
| 5,925,043 A | 7/1999 | Kumar et al. |
| 5,965,629 A | 10/1999 | Jung et al. |
| 6,066,137 A | 5/2000 | Greep |
| 6,070,444 A | 6/2000 | Lontine et al. |
| 6,139,547 A | 10/2000 | Lontine et al. |
| 6,146,462 A | 11/2000 | Yializis et al. |
| 6,159,531 A | 12/2000 | Dang et al. |
| 6,293,946 B1 | 9/2001 | Thorne |
| 6,300,641 B1 | 10/2001 | Koh et al. |
| 6,408,755 B1 | 6/2002 | Meisters et al. |
| 6,428,861 B2 | 8/2002 | France et al. |
| 6,486,135 B1 | 11/2002 | Li et al. |
| 6,534,133 B1 | 3/2003 | Kaloyeros et al. |
| 6,548,121 B1 | 4/2003 | Bauer et al. |
| 6,582,429 B2 | 6/2003 | Krishnan et al. |
| 6,602,552 B1 | 8/2003 | Daraskevich et al. |
| 6,730,275 B2 | 5/2004 | Sharma et al. |
| 6,774,018 B2 | 8/2004 | Mikhael et al. |
| 6,869,676 B2 | 3/2005 | Burger et al. |
| 6,932,816 B2 | 8/2005 | Phan |
| 6,951,559 B1 | 10/2005 | Greep |
| 6,953,461 B2 | 10/2005 | McClurken et al. |
| 7,067,405 B2 | 6/2006 | Mikhael et al. |
| 7,083,618 B2 | 8/2006 | Couture et al. |
| 7,147,634 B2 | 12/2006 | Nesbitt |
| 7,156,842 B2 | 1/2007 | Sartor et al. |
| 7,214,413 B2 | 5/2007 | Koulik et al. |
| 7,258,899 B1 | 8/2007 | Sharma et al. |
| 7,288,091 B2 | 10/2007 | Nesbitt |
| 7,300,859 B2 | 11/2007 | Mikhael et al. |
| 7,377,919 B2 | 5/2008 | Heim et al. |
| 7,390,326 B2 | 6/2008 | Nesbitt |
| 7,566,333 B2 | 7/2009 | Van Wyk et al. |
| 7,582,087 B2 | 9/2009 | Tetzlaff et al. |
| 7,588,565 B2 | 9/2009 | Marchitto et al. |
| 7,618,684 B2 | 11/2009 | Nesbitt |
| 7,683,293 B2 | 3/2010 | Buzzi et al. |
| 7,753,908 B2 | 7/2010 | Swanson |
| 7,899,552 B2 | 3/2011 | Atanasoska et al. |
| 7,909,823 B2 | 3/2011 | Moses et al. |
| 7,955,637 B2 | 6/2011 | Nesbitt |
| 7,967,839 B2 | 6/2011 | Flock et al. |
| 7,976,544 B2 | 7/2011 | McClurken et al. |
| 8,814,861 B2 | 8/2014 | Nesbitt |
| 8,828,023 B2 | 9/2014 | Neff et al. |
| 8,865,264 B2 | 10/2014 | Haack et al. |
| 9,655,673 B2 | 5/2017 | McCullough, Jr. et al. |
| 9,820,765 B2 | 11/2017 | Allen, IV et al. |
| 10,368,939 B2 | 8/2019 | Sartor et al. |
| 2001/0045351 A1 | 11/2001 | Koh et al. |
| 2003/0036753 A1 | 2/2003 | Morgan et al. |
| 2003/0158548 A1 | 8/2003 | Phan et al. |
| 2003/0158549 A1 | 8/2003 | Swanson |
| 2003/0229344 A1 | 12/2003 | Dycus et al. |
| 2003/0236518 A1 | 12/2003 | Marchitto et al. |
| 2004/0134770 A1 | 7/2004 | Petersen |
| 2004/0210282 A1 | 10/2004 | Flock et al. |
| 2005/0113828 A1 | 5/2005 | Shields et al. |
| 2005/0203507 A1 | 9/2005 | Truckai et al. |
| 2006/0116675 A1 | 6/2006 | McClurken et al. |
| 2007/0029500 A1 | 2/2007 | Coulombe et al. |
| 2007/0184208 A1 | 8/2007 | Sharma et al. |
| 2008/0050291 A1 | 2/2008 | Nagasawa |
| 2008/0063895 A1 | 3/2008 | Jun et al. |
| 2008/0167398 A1 | 7/2008 | Patil et al. |
| 2009/0102886 A1 | 4/2009 | Sieber et al. |
| 2010/0069904 A1 | 3/2010 | Cunningham |
| 2011/0213357 A1 | 9/2011 | Schechter |
| 2011/0270251 A1 | 11/2011 | Horner et al. |
| 2012/0252709 A1 | 10/2012 | Felts et al. |
| 2013/0116682 A1 | 5/2013 | Koo et al. |
| 2015/0141993 A1 | 5/2015 | Schechter et al. |
| 2017/0119457 A1 | 5/2017 | Sartor et al. |
| 2017/0238991 A1 | 8/2017 | Worrell et al. |
| 2023/0329742 A1* | 10/2023 | Boronyak ...... A61B 17/320092 |

FOREIGN PATENT DOCUMENTS

| | | |
|---|---|---|
| KR | 101697283 B1 * | 1/2017 |
| WO | WO-8906528 A1 * | 7/1989 |

* cited by examiner

APPLICATION OF NON-STICK COATINGS ONTO JAWS OF ELECTROSURGICAL TISSUE SEALING INSTRUMENTS

FIELD

This disclosure generally relates to surgical instruments. More particularly, this disclosure relates to systems, assemblies, and methods for applying non-stick coatings onto jaws of electrosurgical tissue sealing instruments.

BACKGROUND

Electrosurgical forceps utilize mechanical clamping action along with electrical energy to effect hemostasis on the clamped tissue. The forceps (open, laparoscopic, or endoscopic) include sealing plates which apply energy to the clamped tissue. By controlling the intensity, frequency and duration of the energy applied through the sealing plates to the tissue, a surgeon can cut, coagulate, cauterize, and/or seal tissue.

An issue in electrosurgical procedures is the build-up of eschar, dead tissue sticking to the sealing plates. To remedy this issue, the electrodes (sealing plates) are cleaned one or more times during the surgical procedure. Further, efforts have also been made to reduce the sticking of soft tissue to the sealing plates during application of energy. In general, such efforts have included non-stick surface coatings, such as polytetrafluoroethylene (PTFE, commonly sold under the trademark TEFLON®) for increasing the lubricity of the sealing plates. However, these materials may interfere with the efficacy and efficiency of hemostasis.

SUMMARY

This disclosure relates to the application of non-stick coatings onto sealing plates of electrosurgical instruments to reduce the sticking of soft tissue to the sealing plates during the application of energy. Systems, assemblies, and methods of this disclosure are designed to provide a flexible approach to applying non-stick coatings onto sealing plates during a surgical procedure (e.g., as needed or desired), and to ease the cleaning of eschar during a surgical procedure. The non-stick coatings are configured to minimize tissue sticking and charring and thus, the build-up of eschar on the sealing plates during a surgical procedure, thereby increasing tissue sealing performance and reducing the cleaning required to remove eschar from the sealing plates. The systems, assemblies, and methods of this disclosure make applying these non-stick coatings onto sealing plates in the operating room a simple, straightforward, and cost-effective procedure.

In aspects, this disclosure provides a coating assembly for coating jaws of an electrosurgical instrument including a dispensing device and a jaw applicator. The dispensing device has a non-stick coating material contained therein and includes a discharge port. The jaw applicator includes an applicator body defining a cavity therein. The applicator body includes a first wall and a second wall disposed in spaced relation relative to each other and the cavity extends between the first and second walls. Each of the first and second walls has openings defined therethrough that are in open communication with the cavity. The discharge port of the dispensing device is configured to engage the jaw applicator in a fluid tight manner to define a flow path for the non-stick coating material that extends out of the discharge port, into the cavity of the applicator body, and out of the openings defined in the first and second walls.

In some aspects, the applicator body includes a side wall interconnecting the first and second walls. The side wall may extend around a first longitudinal side of the applicator body, a distal end portion of the applicator body, and a second longitudinal side of the applicator body. In some aspects, the applicator body includes an end wall extending across a proximal end portion of the applicator body. In certain aspects, the cavity is further defined by the side wall, and the side wall includes a connection hole defined therethrough that is configured to receive the discharge port of the dispensing device therein.

The non-stick coating material may include hexamethyldisiloxane.

In some aspects, the jaw applicator further includes a brush assembly coupled to the applicator body. The brush assembly may include a first brush and a second brush. The first brush may be disposed adjacent to an outer surface of the first wall and the second brush may be disposed adjacent to an outer surface of the second wall. The first and second brushes may be longitudinally slidable along the first and second walls of the applicator body.

The coating assembly may be a component of a system for coating jaws of an electrosurgical instrument. The system may further include an end effector including a first jaw and a second jaw disposed in opposed relation to each other and movable between an open position and a closed position. Each of the first and second jaws may include a tissue-engaging surface. The end effector may be configured to engage the jaw applicator such that the tissue-engaging surfaces of the first and second jaws respectively face outer surfaces of the first and second walls of the applicator body such that the flow path for the non-stick coating material terminates at the tissue-engaging surfaces of the first and second jaws.

In aspects, this disclosure provides a coating assembly for coating jaws of an electrosurgical instrument including a jaw applicator including an applicator body having a first wall and a second wall disposed in spaced relation relative to each other. Each of the first and second walls includes an outer surface facing outwardly from opposed sides of the applicator body. The coating assembly also includes a first layer of a non-stick coating material disposed on the outer surface of the first wall and a second layer of non-stick coating material disposed on the outer surface of the second wall.

In some aspects, the applicator body includes a side wall interconnecting the first and second walls. The side wall may extend around a first longitudinal side of the applicator body, a distal end portion of the applicator body, and a second longitudinal side of the applicator body. In some aspects, the side wall extends outwardly beyond the outer surfaces of the first and second walls.

Each of the first and second layers of the non-stick coating material may include hexamethyldisiloxane.

In some aspects, the jaw applicator further includes a brush assembly coupled to the applicator body. The brush assembly may include a first brush and a second brush. The first brush may be disposed adjacent to the outer surface of the first wall and the second brush may be disposed adjacent to the outer surface of the second wall. The first and second brushes may be longitudinally slidable along the first and second walls of the applicator body.

The coating assembly may be a component of a system for coating jaws of an electrosurgical instrument. The system may further include an end effector including a first jaw and a second jaw disposed in opposed relation to each other and movable between an open position and a closed position.

Each of the first and second jaws may include a tissue-engaging surface. The end effector may be configured to engage the jaw applicator such that the tissue-engaging surfaces of the first and second jaws respectively contact the first and second layers of the non-stick coating material disposed on the outer surfaces of the first and second walls of the applicator body.

In aspects, this disclosure provides a method of applying a coating onto jaws of an electrosurgical instrument. The method includes moving first and second jaws of an end effector from an open position to a closed position such that tissue-engaging surfaces of the first and second jaws engage a jaw applicator of a coating assembly, and transferring a non-stick coating material from the coating assembly to the tissue-engaging surfaces of the first and second jaws.

In some aspects, the method further includes delivering the non-stick coating material from a dispensing device of the coating assembly, through the jaw applicator, and onto the tissue-engaging surfaces of the first and second jaws.

In some aspects, the method further includes contacting first and second pre-formed layers of the non-stick coating material that are disposed on the jaw applicator with the tissue-engaging surfaces of the first and second jaws.

The details of one or more aspects of this disclosure are set forth in the accompanying drawings and the description below. Other aspects, as well as features, objects, and advantages of the aspects described in this disclosure will be apparent from the description and drawings, and from the claims.

BRIEF DESCRIPTION OF DRAWINGS

Various aspects of this disclosure are described hereinbelow with reference to the drawings, which are incorporated in and constitute a part of this specification, wherein.

DETAILED DESCRIPTION

Figure 1:
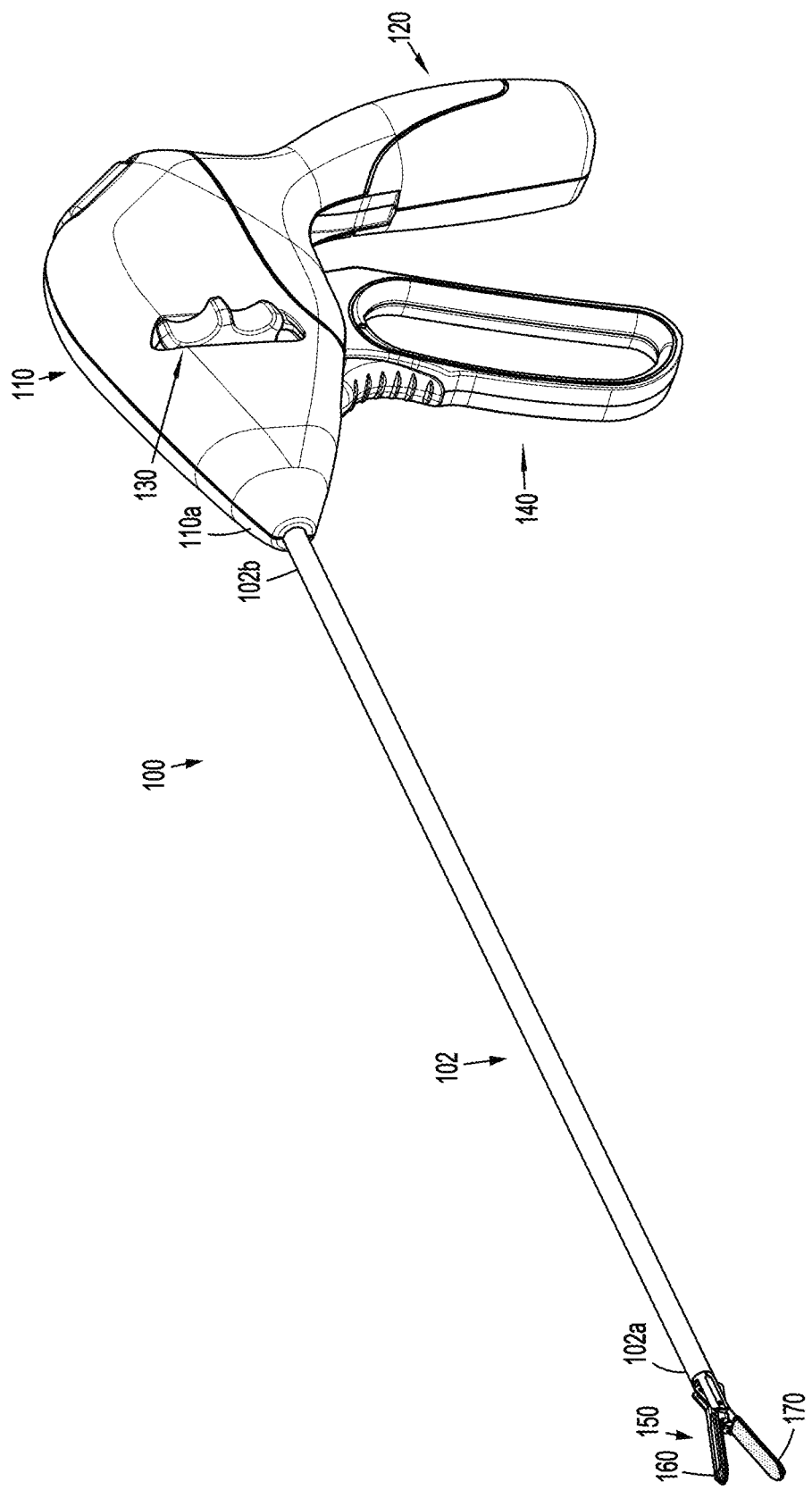
FIG. 1 is a perspective view of an endoscopic bipolar forceps in accordance with an aspect of this disclosure.

Aspects of this disclosure will now be described in detail with reference to the drawing figures wherein like reference numerals identify similar or identical elements. Throughout this description, the term "proximal" refers to a portion or component of a structure that is closer to a user, and the term "distal" refers to a portion or component of the structure that is farther from the user. The terms "about," "generally," "substantially," and the like, shall be understood as words of approximation that take into account relatively little to no variation in the modified terms (e.g., generally accepted manufacturing, use, environmental, or measurement tolerances differing, for example, by less than 10%). It should be understood that various components of this disclosure, such as those numbered in the 100 series or plainly numbered, correspond to components of the disclosure similarly numbered in the 200, 300, 400, etc. series or prime numbered, such that redundant explanation of similar components need not be repeated herein.

It should be understood that the disclosed aspects are merely exemplary of the disclosure and may be embodied in various forms. Well-known functions or constructions are not described in detail to avoid obscuring the disclosure in unnecessary detail. Therefore, specific structural and functional details disclosed herein are not to be interpreted as limiting, but merely as a basis for the claims and as a representative basis for teaching one skilled in the art to variously employ the disclosure in virtually any appropriately detailed structure.

FIG. 1 illustrates a forceps 100 for use with various surgical procedures in the form of endoscopic forceps. The forceps 100 includes a housing 110, a handle assembly 120, a rotating assembly 130, a trigger assembly 140, and an end effector 150 that mutually cooperate to grasp, seal, and divide tubular vessels and vascular tissues. The forceps 100 include a shaft 102 extending from a distal end 110a of the housing 110. The shaft 102 has a distal end 102a configured to mechanically engage the end effector 150 and a proximal end 102b that mechanically engages the housing 110.

The end effector 150 includes first and second jaws 160, 170 (also referred to herein generally as jaws) which cooperate to effectively grasp tissue for sealing purposes. Both of the jaws 160, 170 pivot relative to one another about a pivot pin (not shown). Alternatively, one of the first and second jaws 160, 170 may be movable and the other stationary. The jaws 160, 170 may be curved to facilitate manipulation of tissue and to provide better "line-of-sight" for accessing targeted tissues. A sensor (not shown) may be disposed on or proximate to at least one of the jaws 160, 170 for sensing tissue parameters (e.g., temperature, impedance, etc.) generated by the application of electrosurgical energy to tissue via the jaws 160, 170. The sensor may include a temperature sensor, tissue hydration sensor, impedance sensor, optical clarity sensor, jaw gap sensor, strain and/or force sensor, or the like. Through a cable (not shown) coupling the forceps 100 to an electrosurgical generator (not shown), sensed tissue parameters may be transmitted as data to the electrosurgical generator having suitable data processing components (e.g., microcontroller, memory, sensor circuitry, etc.) for controlling delivery of electrosurgical energy to the forceps 100 based on data received from the sensor.

Figure 2:
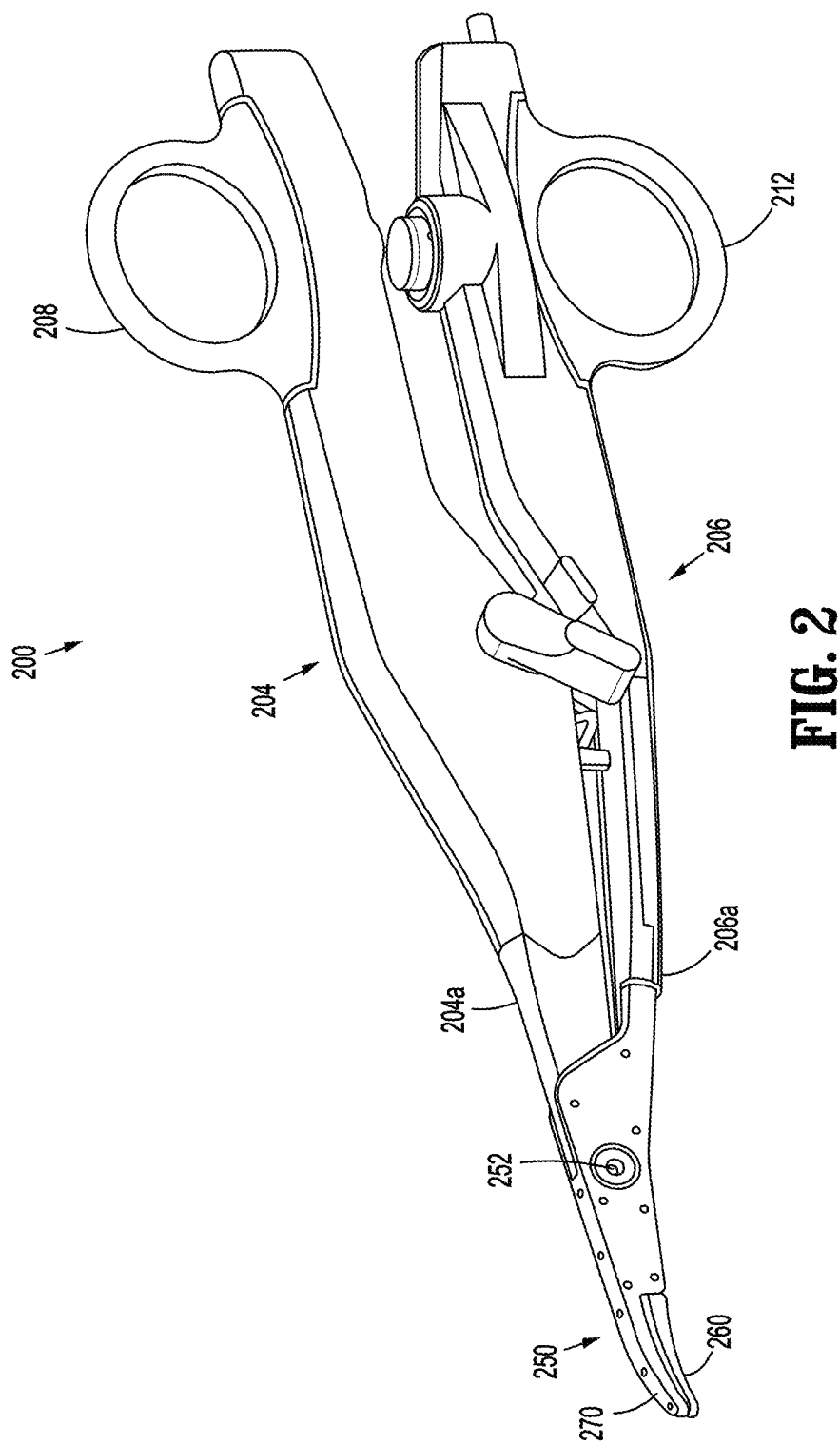
FIG. 2 is a perspective view of an open bipolar forceps in accordance with an aspect of this disclosure.

FIG. 2 illustrates a forceps 200 for use with various surgical procedures in the form of open forceps. The forceps 200 includes first and second shafts 204, 206 (also referred to herein generally as shafts) having an end effector 250 disposed at distal ends 204a, 206a of the shafts 204, 206. The end effector 250 includes first and second jaws 260, 270 that are connected about a pivot member 252 and that are movable relative to one another to grasp tissue. Each of the shafts 204, 206 includes a handle 208, 212 to facilitate movement of the shafts 204, 206 relative to one another to pivot the jaws 260, 270 between an open position, wherein the jaws 260, 270 are disposed in spaced relation relative to each other, and a closed position, wherein the jaws 260, 270 cooperate to grasp tissue therebetween. Similar to the forceps 100 shown in FIG. 1, a sensor (not shown) may be disposed on or proximate to at least one of the jaws 260, 270 of the forceps 200 for sensing tissue parameters generated by the application of electrosurgical energy to tissue via the jaws 260, 270.

For a detailed description of the structure and function of exemplary forceps (endoscopic and open) suitable for use with aspects of this disclosure, reference may be made to U.S. Pat. Nos. 7,582,087, 7,909,823, 9,655,673, and 9,820,765 the entire contents of each of which are incorporated herein by reference.

Figure 3A:
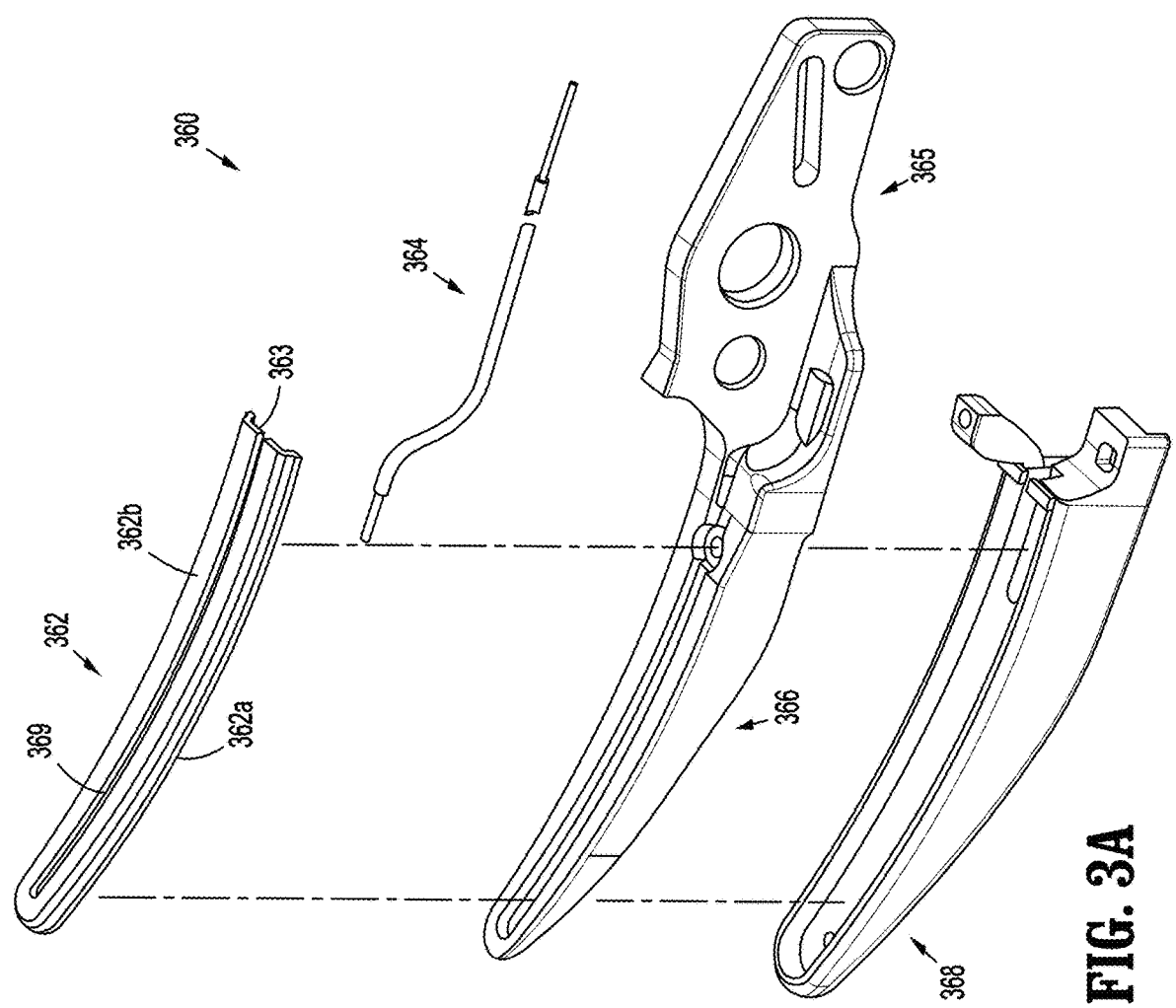
FIGS. 3A and 3B are exploded views of opposing jaws in accordance with an aspect of this disclosure.
Figure 3B:
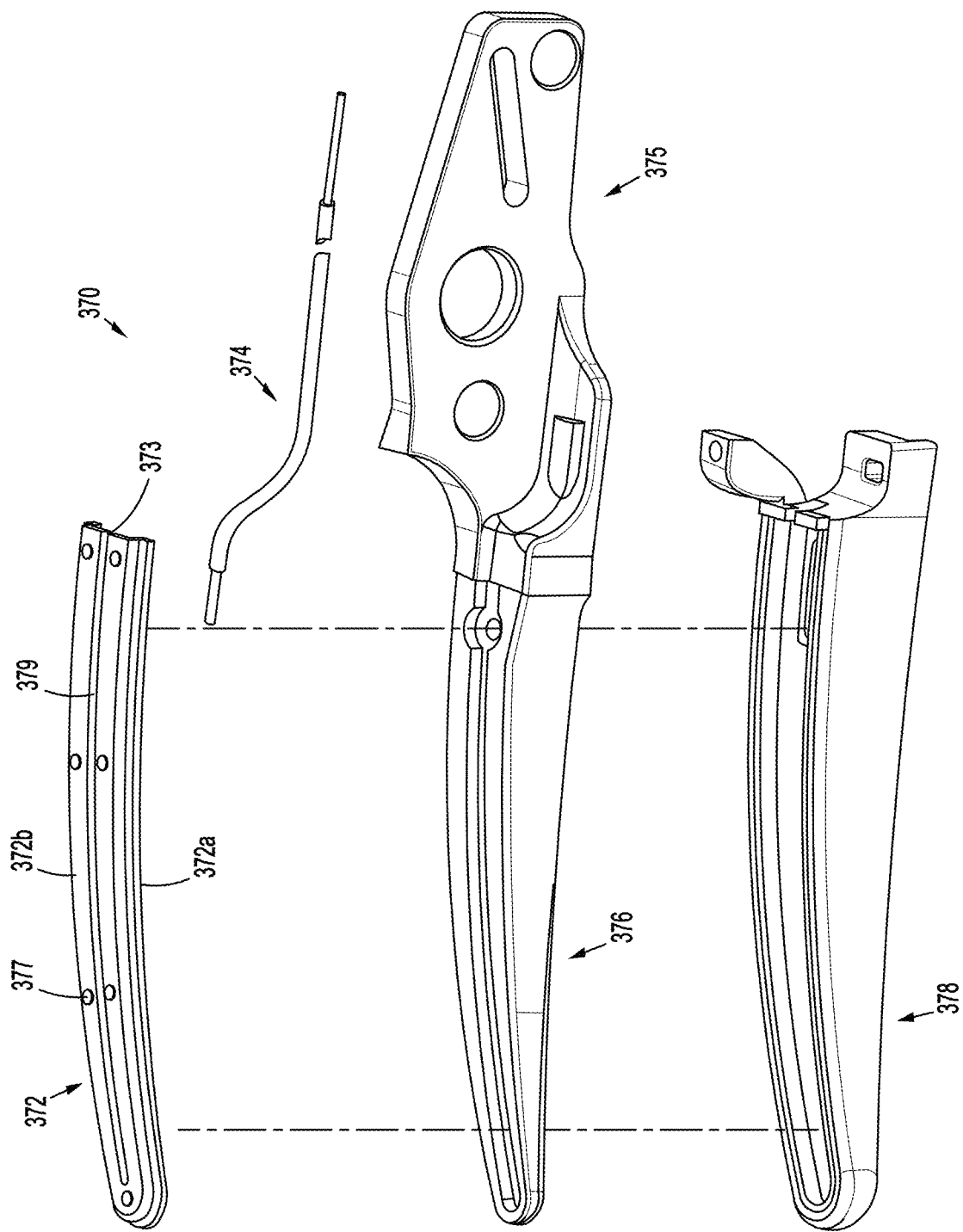

FIGS. 3A and 3B are views of jaws 360, 370, respectively, in accordance with aspects of this disclosure. The jaws 360, 370 may be utilized with the endoscopic forceps 100 (FIG. 1) or the open forceps 200 (FIG. 2) and operate similarly as described above with respect to the jaws 160, 170 (FIG. 1) and the jaws 260, 270 (FIG. 2). Each of the jaws 360, 370 include: sealing plates 362, 372, electrical leads 364, 374, support bases 366, 376 that extend distally from flanges 365, 375, and insulative housings 368, 378.

Each of the sealing plates 362, 372 is formed from an electrically conductive material (e.g., stainless steel), and includes an underside 362a, 372a and an outer or tissue-engaging surface 362b, 372b. The underside 362a, 372a may include an electrically insulative layer 363, 373 bonded thereto or otherwise disposed thereon. The electrically insulative layers 363, 373 operate to electrically insulate the sealing plates 362, 372 from the support bases 366, 376. Further, the electrically insulative layers 363, 373 operate to prevent or slow the onset of corrosion of the sealing plates 362, 372 at least on the undersides 362a, 372a thereof.

The support bases 366, 376 are configured to support the sealing plates 362, 372 thereon. The sealing plates 362, 372 may be affixed atop the support bases 366, 376 by any suitable method including but not limited to snap-fitting, overmolding, stamping, ultrasonic welding, laser welding, etc. The support bases 366, 376 and the sealing plates 362, 372 are at least partially encapsulated by the insulative housings 368, 378 by way of an overmolding process to secure sealing plates 362, 372 to the support bases 366, 376. The sealing plates 362, 372 are coupled to electrical leads 364, 374 via any suitable method (e.g., ultrasonic welding, crimping, soldering, etc.). The electrical leads 364, 374 serve to deliver electrosurgical energy (e.g., from an electrosurgical energy generator) to the sealing plates 362, 372. More specifically, the electrical lead 364 supplies a first electrical potential to the sealing plate 362 and the electrical lead 374 supplies a second electrical potential to the sealing plate 372.

At least one of the jaws 360, 370 (see the second jaw 370 in FIG. 3B), may also include one or a series of stop members 377 disposed on the tissue-engaging surface 372b of the sealing plate 372 to facilitate gripping and manipulation of tissue and to define a gap between the jaws 360, 370 during sealing and cutting of tissue. The stop member(s) 377 may be disposed (e.g., formed, deposited, sprayed, affixed, coupled, etc.) onto the sealing plate 372 during manufacturing.

The sealing plates 362, 372 may include knife slots 369, 379 defined longitudinally therethrough and configured to receive a knife blade (not shown) that reciprocates through the knife slots 369, 379 to cut tissue. The electrically insulative layers 363, 373 disposed on the undersides 362a, 372a of the sealing plates 362, 372 allow for use of various blade configurations such as, for example, T-shaped blades or I-shaped blades that may contact the underside 362a, 372a of the sealing plate 362, 372 during reciprocation through the knife slots 369, 379. That is, the electrically insulative layers 363, 373 operate to protect both the knife blade and the undersides 362a, 372a of the sealing plates 362, 372 from damage or wear. Further, in the instance that an electrically conductive knife blade (not shown) is utilized (e.g., for electrical tissue cutting), the electrically insulative layers 363, 373 help to electrically insulate the sealing plates 362, 372 from the electrically conductive knife blade.

Figure 4:
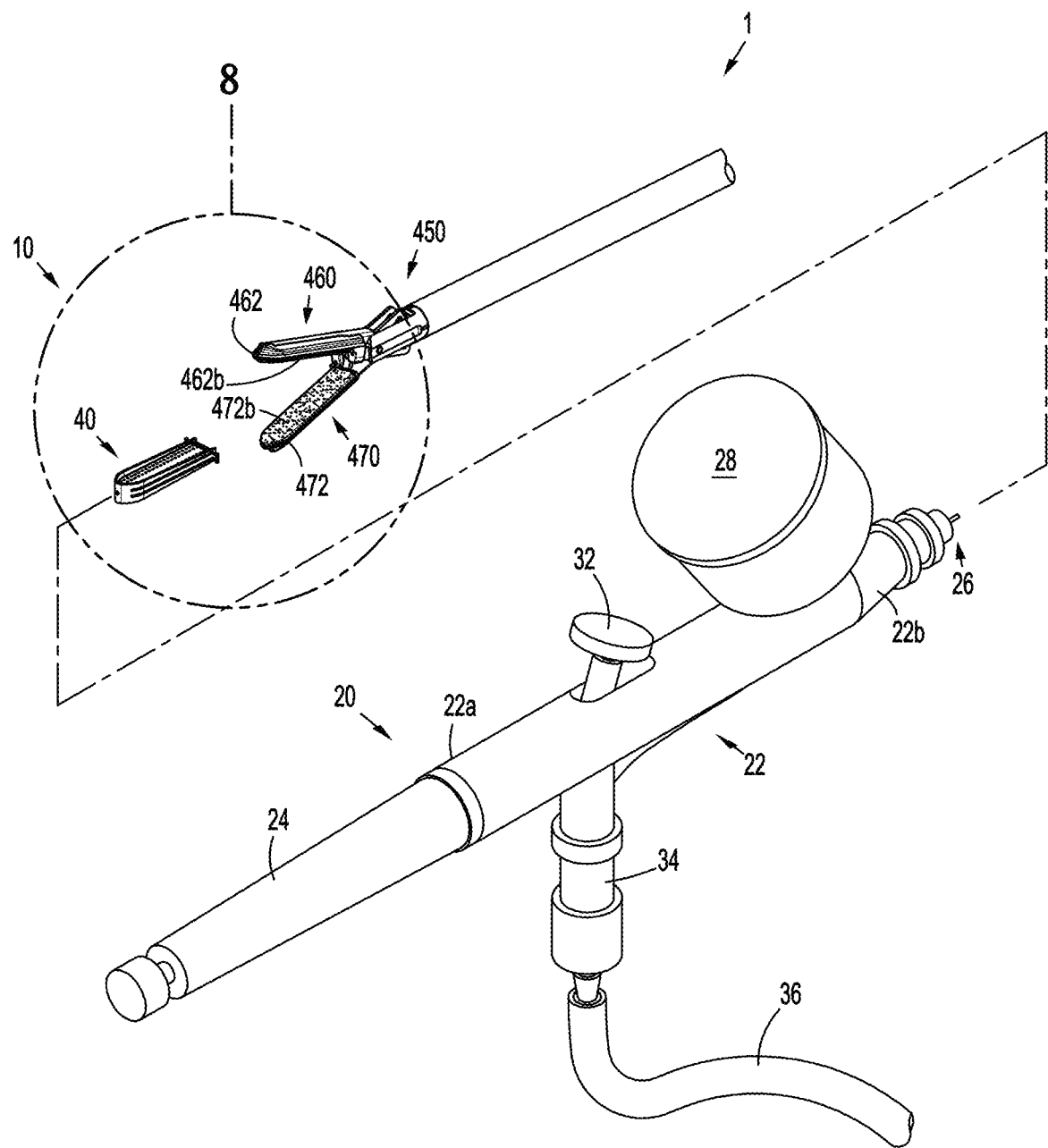
FIG. 4 is a perspective view of a system for applying non-stick coatings, the system including a coating assembly including a dispensing device and a jaw applicator, and an end effector including jaws in accordance with an aspect of this disclosure.

FIG. 4 illustrates a system 1 including a coating assembly 10 and an end effector 450 including jaws 460, 470. The coating assembly 10 includes a dispensing device 20 and a jaw applicator 40 for applying a non-stick coating onto the tissue-engaging surfaces 462b, 472b of the sealing plates 462, 472 of the jaws 460, 470.

The dispensing device 20 is a handheld or portable spraying device including, for example, a spray nozzle, atomizer, nebulizer, combinations thereof, and the like, configured to dispense a non-stick coating material as a liquid spray or as a mist. The dispensing device 20 includes a housing 22 having a proximal end portion 22a including a handle 24 and a distal end portion 22b including a discharge port 26 in open communication with a channel (not shown) defined within the housing 22. In aspects, the discharge port 26 is a nozzle. It is envisioned that the discharge port 26 may be any outlet (e.g., a spout) configured to permit fluid flow therethrough.

Figure 12:
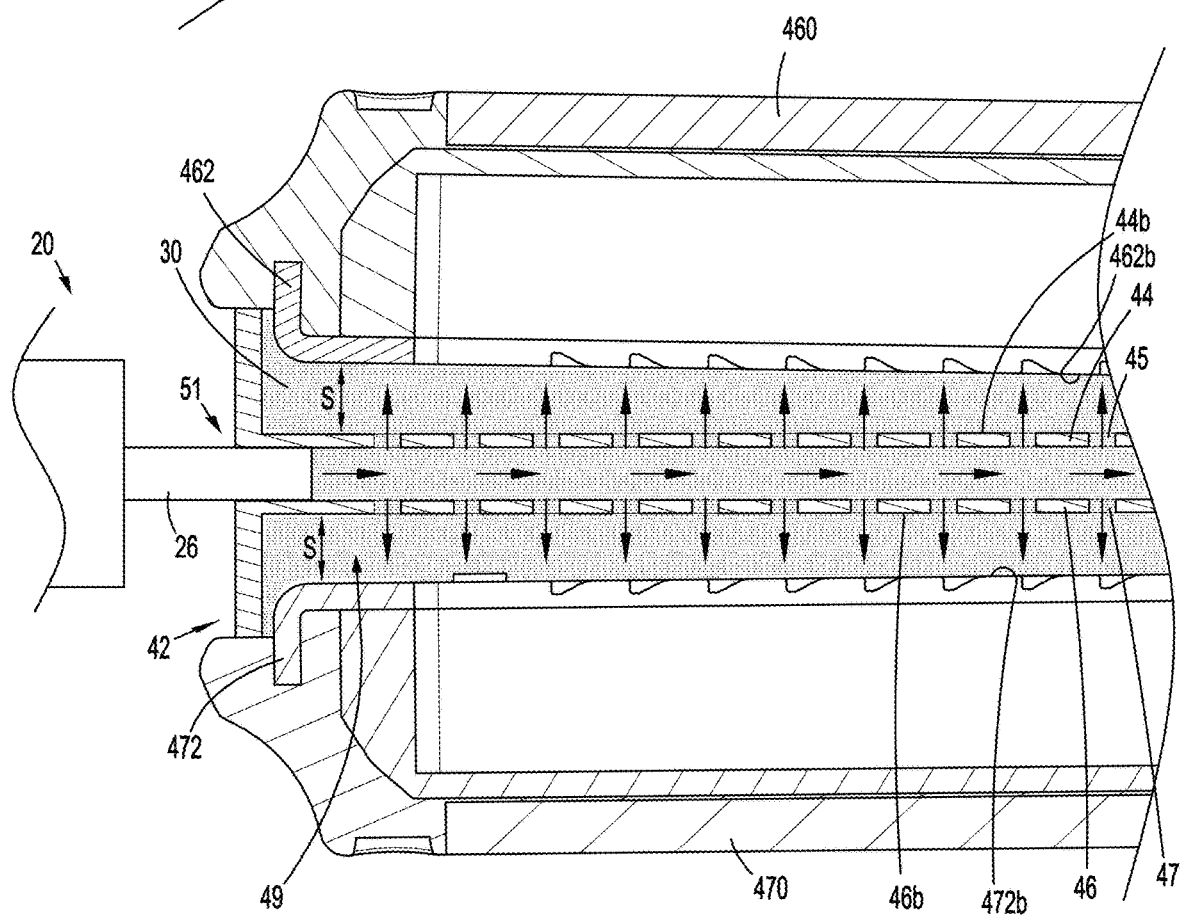
FIG. 12 is a cross-sectional view of the jaws, the jaw applicator, and the dispensing device of FIG. 11, taken along section line 12-12 of FIG. 11.

The housing 22 supports a tank 28 that is disposed in open communication with the discharge port 26 via the channel (not shown) defined in the housing 22. The tank 28 contains a non-stick coating material 30 (FIG. 12). The non-stick coating material 30 may be any material capable of providing the desired functionality (namely, reduction of tissue sticking while simultaneously maintaining sufficient electrical transmission to permit tissue sealing) to the sealing plates 462, 472, provided it has adequate biocompatibility. The non-stick coating material 30 may be porous when applied to allow for electrical transmission.

In aspects, the non-stick coating material 30 includes silicone or silicone resins that can withstand heat generated during tissue sealing. Silicone resins suitable for the non-stick coating material 30 include, but are not limited to, polydimethyl siloxanes, polyester-modified methylphenyl polysiloxanes, such as polymethylsilane and polymethylsiloxane, and hydroxyl functional silicone resins. In some aspects, the non-stick coating material 30 is a composition including a siloxane, which may include hexamethyldisiloxane, tetramethylsilane, hexamethyldisilazane, or combinations thereof. In some aspects, the non-stick coating material 30 includes polydimethylsiloxane and, in certain aspects, the non-stick coating material 30 includes hexamethyldisiloxane. Such non-stick coating materials operate to reduce the sticking of tissue to sealing plates. Additionally, polydimethylsiloxane may operate to reduce pitting of the sealing plates and may provide durability against electrical and/or mechanical degradation of the sealing plates.

The housing 22 supports an actuator 32 for controlling the flow of the non-stick coating material 30 (FIG. 12) from the dispensing device 20. The actuator 32 may be any finger-actuated control button, knob, toggle, slide, or other interface for activating/deactivating the delivery of the non-stick coating material 30. The actuator 32 may have two discrete positions (e.g., on/off), multiple discrete positions (e.g., low/medium/high) or sliding positions (e.g., to variably control pressure, speed, intensity, etc.) to control the flow of the non-stick coating material 30.

The housing 22 includes a connector 34 for coupling to a supply line 36 that, in turn, is operably coupled to the actuator 32 for supplying a fluid (e.g., compressed air, water, a solvent) through the channel (not shown) of the housing 22 to control the delivery and flow of the non-stick coating material 30 through the discharge port 26.

Figure 5:
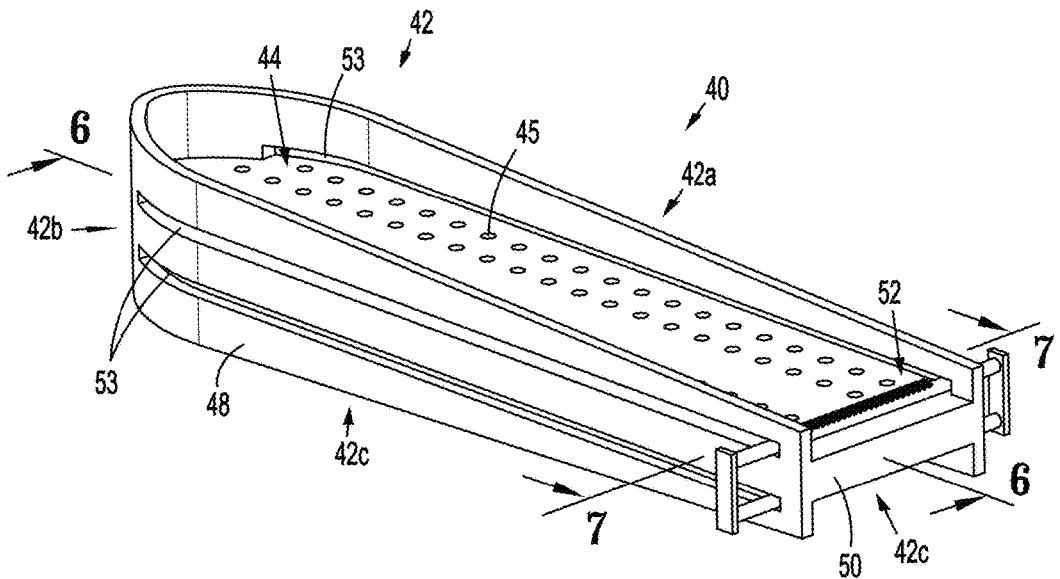
FIG. 5 is a perspective view of the jaw applicator of FIG. 4.
Figure 6:
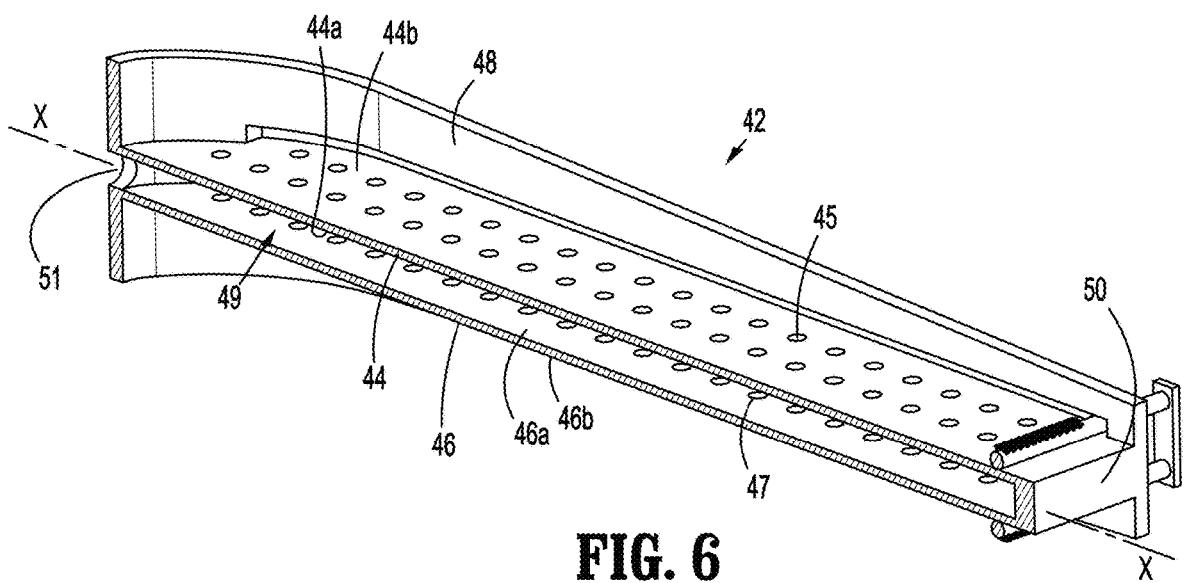
FIGS. 6 and 7 are cross-sectional views of the jaw applicator of FIG. 5, take along respective section lines 6-6 and 7-7 of FIG. 5.
Figure 7:
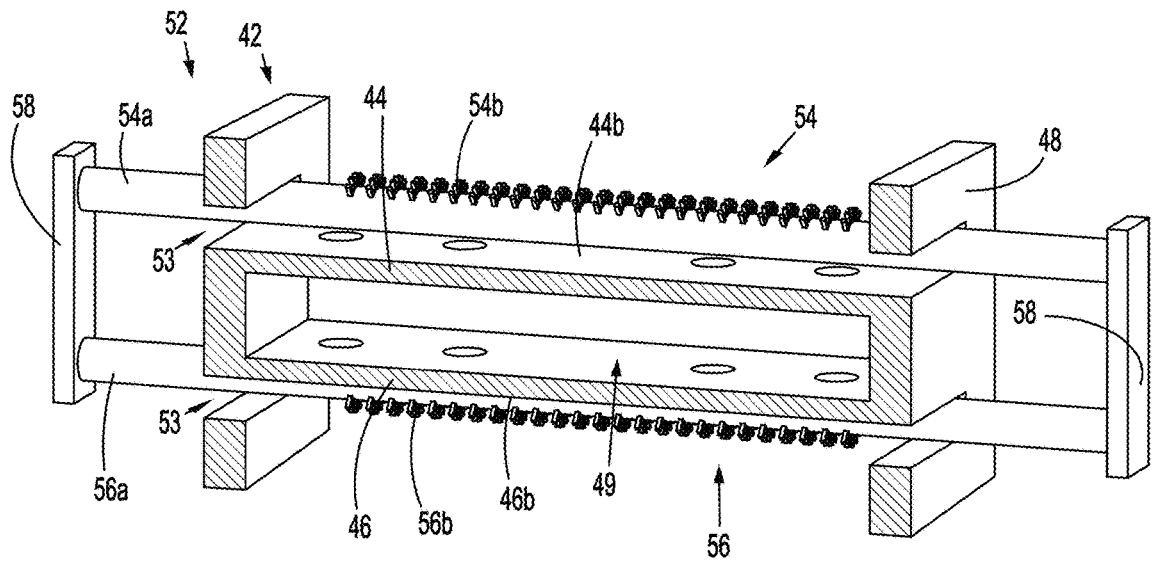

With reference to FIGS. 5-7, in conjunction with FIG. 4, the jaw applicator 40 includes an applicator body 42 extending along a central longitudinal axis "X." The applicator body 42 includes a first wall 44 and a second wall 46 disposed in spaced relation relative to each other and extending along axes that are substantially parallel to the central longitudinal axis "X." The first and second walls 44, 46 include inner surfaces 44a, 46a that face one another and outer surfaces 44b, 46b that face outwardly from opposed sides of the applicator body 42. The outer surfaces 44b, 46b are configured to face the tissue-engaging surfaces 462b, 472b of the sealing plates 462, 472 when the jaws 460, 470 are engaged with the jaw applicator 40. The first and second walls 44, 46 define openings 45, 47 that extend through the inner surfaces 44a, 46a and the outer surfaces 44b, 46b.

Figure 10:
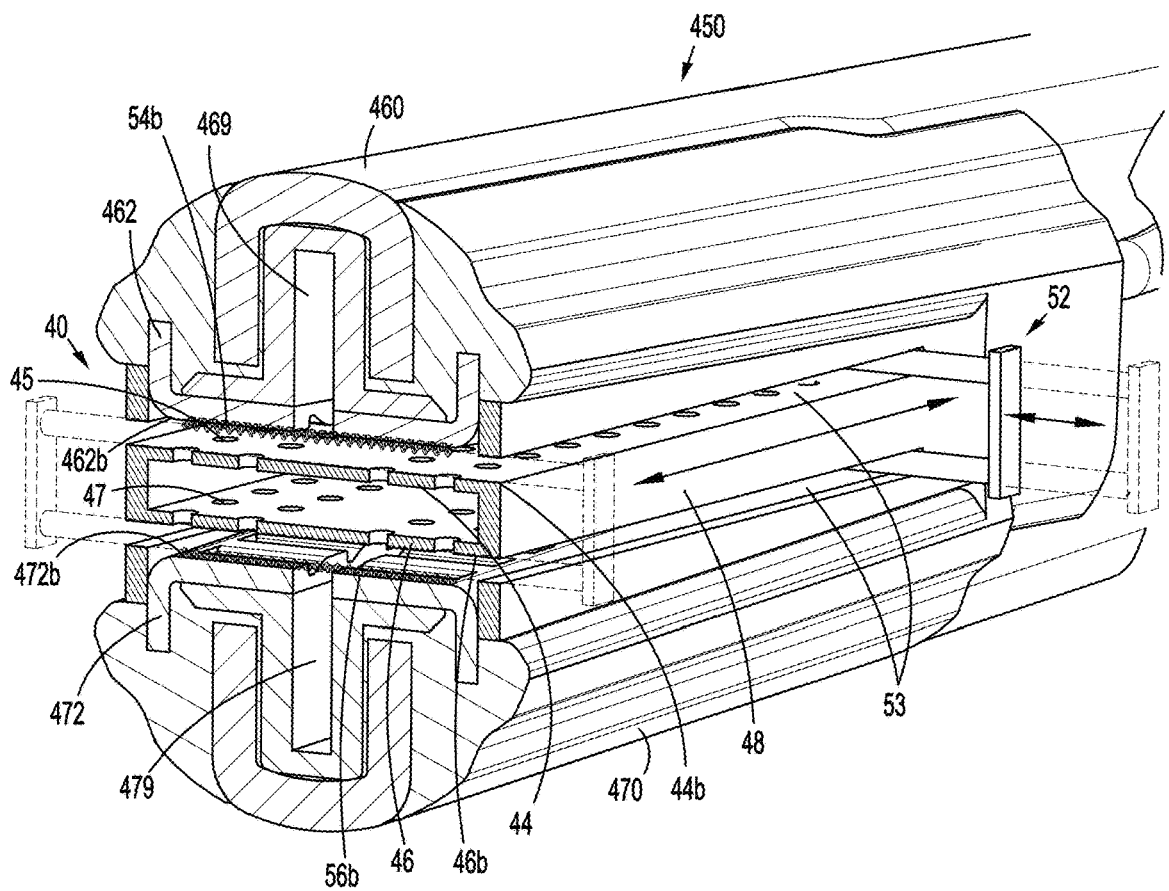
FIG. 10 is a cross-sectional view of the jaws and the jaw applicator of FIG. 9, taken along section line 10-10 of FIG. 9.

The openings 45, 47 are all the same shape and size, and are disposed in longitudinally extending rows that align with the tissue-engaging surfaces 462b, 472b of the sealing plates 462, 472 (on opposed sides of the knife slots 469, 479 (FIG. 10)) when the jaw applicator 40 is engaged with the jaws 460, 470 (see FIG. 10). It should be understood, however, that the size, shape, and pattern of the openings 45, 47 may vary depending on the desired coverage of the non-stick coating material 30 (FIG. 12) on the sealing plates 462, 472. For example, the uniformity of the openings 45, 47 enables a continuous non-stick coating to be formed on each of the sealing plates 462, 472 of a desired thickness. In other aspects, the openings 45, 47 may be clustered in groups or provided in select portions of the first and second walls 44, 46 to form a discontinuous non-stick coating on the sealing plates 462, 472 of desired thicknesses across the sealing plates 462, 472.

The jaw applicator 40 includes a side wall 48 having a substantially U-shape that extends continuously around a first longitudinal side 42a of the applicator body 42, a distal end portion 42b of the applicator body 42, and a second longitudinal side 42c of the applicator body 42. A proximal end portion 42d of the applicator body 42 is devoid of the side wall 48. The side wall 48 extends outwardly beyond the outer surfaces 44b, 46b of the first and second walls 44, 46 and acts as a flange or guide for the proper positioning of the jaws 460, 470 relative to the applicator body 42. In aspects, the jaws 460, 470 engage the side wall 48 so that the tissue-engaging surfaces 462b, 472b of the sealing plates 462, 472 are spaced from, and diametrically opposed to, the outer surfaces 44b, 46b of the first and second walls 44, 46.

A cavity 49 is defined in the applicator body 42 by the inner surfaces 44a, 46a of the first and second walls 44, 46, the side wall 48, and an end wall 50 disposed at the proximal end portion 42d of the applicator body 42. The cavity 49 is closed, except for the openings 45, 47 defined through the first and second walls 44, 46, and a connection hole 51 defined through the side wall 48 at the distal end portion 42b of the applicator body 42. The connection hole 51 is sized and shaped to receive the discharge port 26 of the dispensing device 20 in a fluid tight manner.

The jaw applicator 40 includes a brush assembly 52 coupled to the applicator body 42. The brush assembly 52 is configured to clean the tissue-engaging surfaces 462b, 472b of the sealing plates 462, 472 when the jaw applicator 40 is engaged with the jaws 460, 470 of the end effector 450. The brush assembly 52 includes a first brush 54 and a second brush 56 disposed in substantially parallel relationship with each other and disposed outwardly of the outer surfaces 44b, 46b of the first and second walls 44, 46. The first and second brushes 54, 56 include elongate brush bodies or rods 54a, 56a extending transversely across the outer surfaces 44b, 46b of the first and second walls 44, 46. The rods 54a, 56a pass through longitudinally extending channels 53 defined through the side wall 48 such that the rods 54a, 56a extend laterally beyond the side wall 48 of the applicator body 42. The ends of the rods 54a, 56a are interconnected by grips 58 that may be used to move the brush assembly 52 relative to the applicator body 42.

The first and second brushes 54, 56 are longitudinally movable along the length (e.g., the entire length) of the applicator body 42 by sliding the rods 54a, 56a through the longitudinally extending channels 53 of the side wall 48 between proximal and distal positions. The first and second brushes 54, 56 include cleaning bristles 54b, 56b extending outwardly from at least outwardly facing portions of the rods 54a, 56a. The cleaning bristles 54b, 56b are of sufficient length so that when the jaw applicator 40 is engaged with the jaws 460, 470, the cleaning bristles 54b, 56b contact the tissue-engaging surfaces 462b, 472b of the jaws 460, 470. In some aspects, the cleaning bristles 54b, 56b are disposed only on the outwardly facing surface of the rods 54a, 56a such that during movement of the brush assembly 52, the cleaning bristles 54b, 56b do not contact the outer surfaces 44b, 46b of the first and second walls 44, 46. In other aspects, the cleaning bristles 54b, 56b may extend completely around the rods 54a, 54b such that during movement of the brush assembly 52, the cleaning bristles 54b, 56b contact the outer surfaces 44b, 46b of the first and second walls 44, 46. The first and second brushes 54, 56 may include alternative cleaning protrusions, such as pads, that are designed to scrub, scrape, etc. the tissue-engaging surfaces 462b, 472b of the jaws 460, 470.

Figure 8:
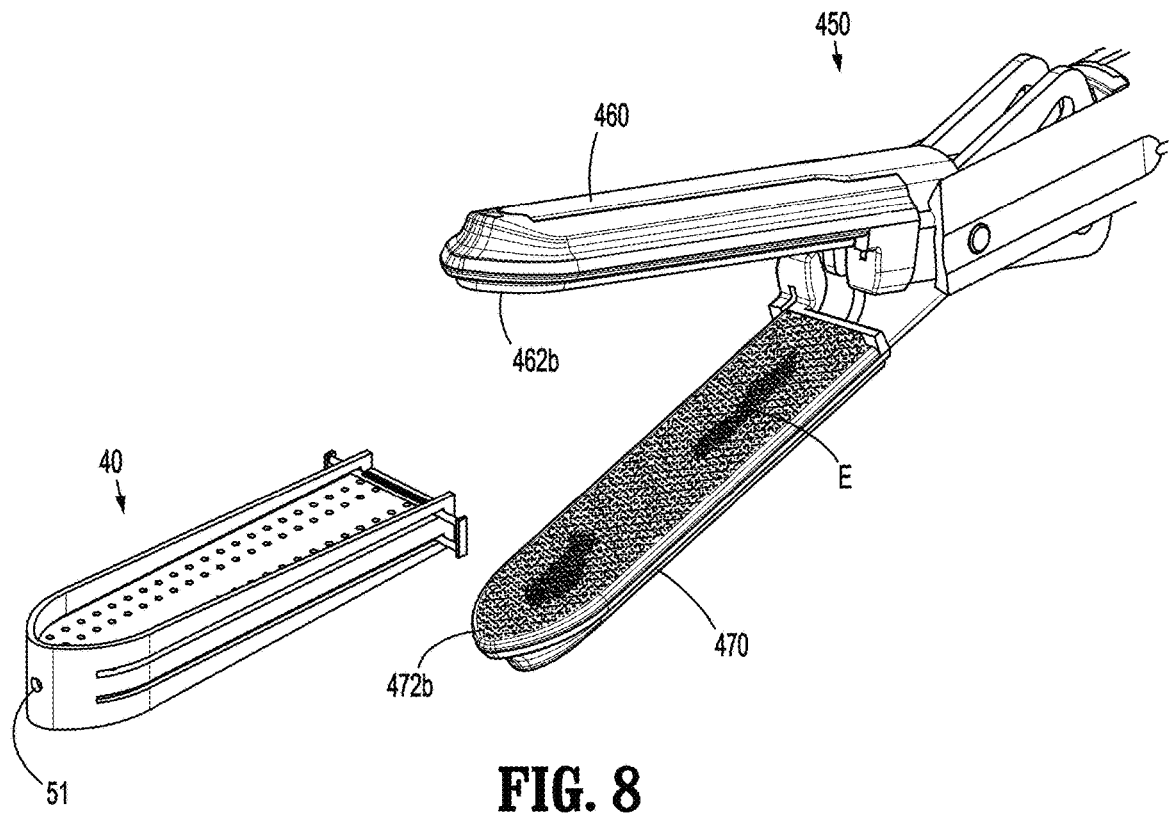
FIG. 8 is a close-up view of the area of detail indicated in FIG. 4.
Figure 9:
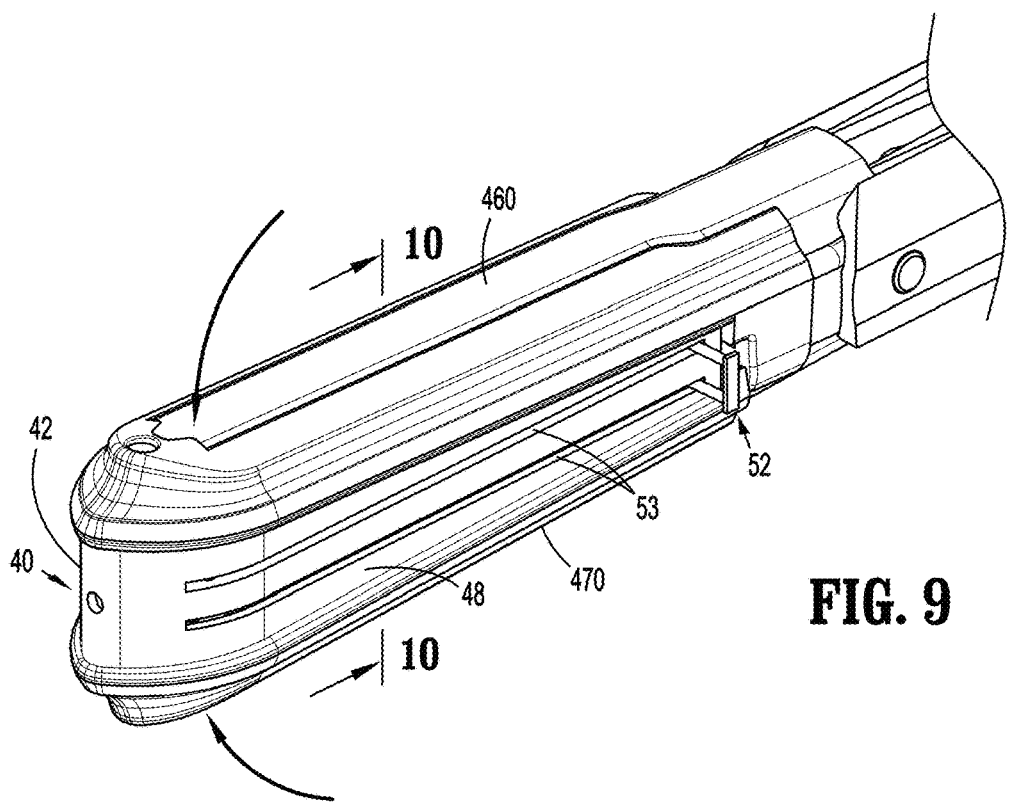
FIG. 9 is a perspective view of the jaws and the jaw applicator of FIG. 8, showing the jaw applicator engaged with the jaws.

FIGS. 8-13 illustrate a method of using the coating assembly 10. Initially, as seen in FIG. 8, the jaw applicator 40 is aligned with the jaws 460, 470 of the end effector 450 while the jaws 460, 470 are disposed in the open position. The jaws 460, 470 are shown having eschar "E" on the tissue-engaging surfaces 462b, 472b, however, it should be understood that the jaws 460, 470 may be clean (e.g., free of eschar "E"). The jaw applicator 40 is positioned between the jaws 460, 470 and the jaws 460, 470 are moved to the closed position, as seen in FIGS. 9 and 10. In the closed position, the jaws 460, 470 engage the side wall 48 of the applicator body 42 and the tissue-engaging surfaces 462b, 472b face the outer surface 44b, 46b of the first and second walls 44, 46 of the applicator body 42.

As seen in FIG. 10, the brush assembly 52 may be slid proximally and distally along the longitudinally-extending channels 53 defined in the side wall 48 of the applicator body 42 so that the cleaning bristles 54b, 56b contact and clean the tissue-engaging surfaces 462b, 472b of the jaws 460, 470 (e.g., removes the eschar "E"). The brush assembly 52 may be passed over the tissue-engaging surface 462b, 472b as many times as necessary to clean the tissue-engaging surfaces 462b, 472b. In aspects in which the jaws 460, 470 are clean prior to loading the jaw applicator 40 into the jaws 460, 470, this cleaning step may be omitted.

Figure 11:
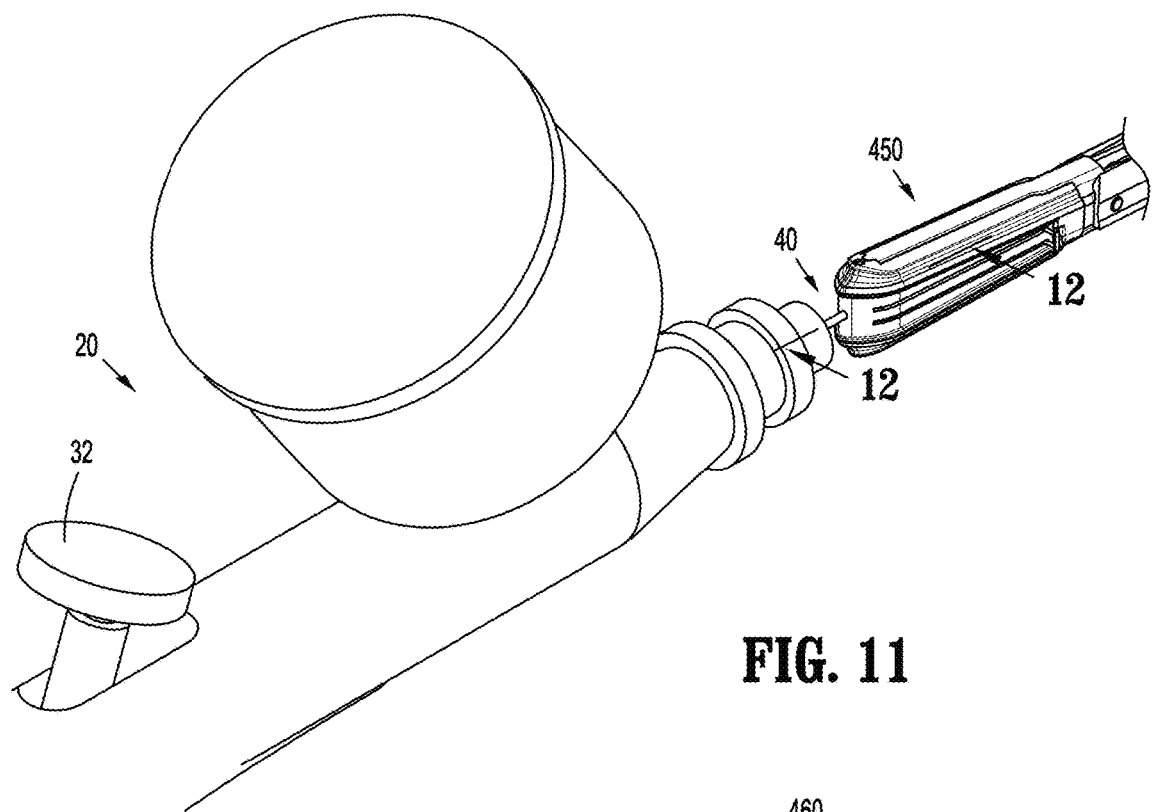
FIG. 11 is a perspective view of the jaws and the jaw applicator of FIG. 9 shown engaged with the dispensing device of FIG. 4.

As seen in FIGS. 11 and 12, the discharge port 26 of the dispensing device 20 is then aligned with the connection hole 51 defined in the jaw applicator 40 and passed therein such that the discharge port 26 is positioned within the cavity 49 defined in the applicator body 42. The dispensing device 20 is then activated, e.g., by pressing the actuator 32, to activate the flow of the non-stick coating material 30. The non-stick coating material 30 follows a flow path extending out of the discharge port 26, into the cavity 49 of the applicator body 42, out the openings 45, 47 defined in the first and second walls 44, 46 of the applicator body 42, and into engagement with the tissue-engaging surface 462b, 472b of the jaws 460, 470. As seen in FIG. 12, the non-stick coating material 30 fills the space "S" defined between the outer surfaces 44b, 46b of the first and second walls 44, 46 and the tissue-engaging surfaces 462b, 472b to cover (partially or entirely) the tissue-engaging surfaces 462b, 472b with the non-stick coating material 30. In some aspects, the space "S" defines a maximum thickness of the non-stick coating material 30. In some aspects, the thickness of the non-stick coating material 30 applied to the jaws 460, 470 is controlled by the amount of non-stick coating material 30 delivered from the dispensing device 20 and the configuration of the openings 45, 47 in the jaw applicator 40.

Figure 13:
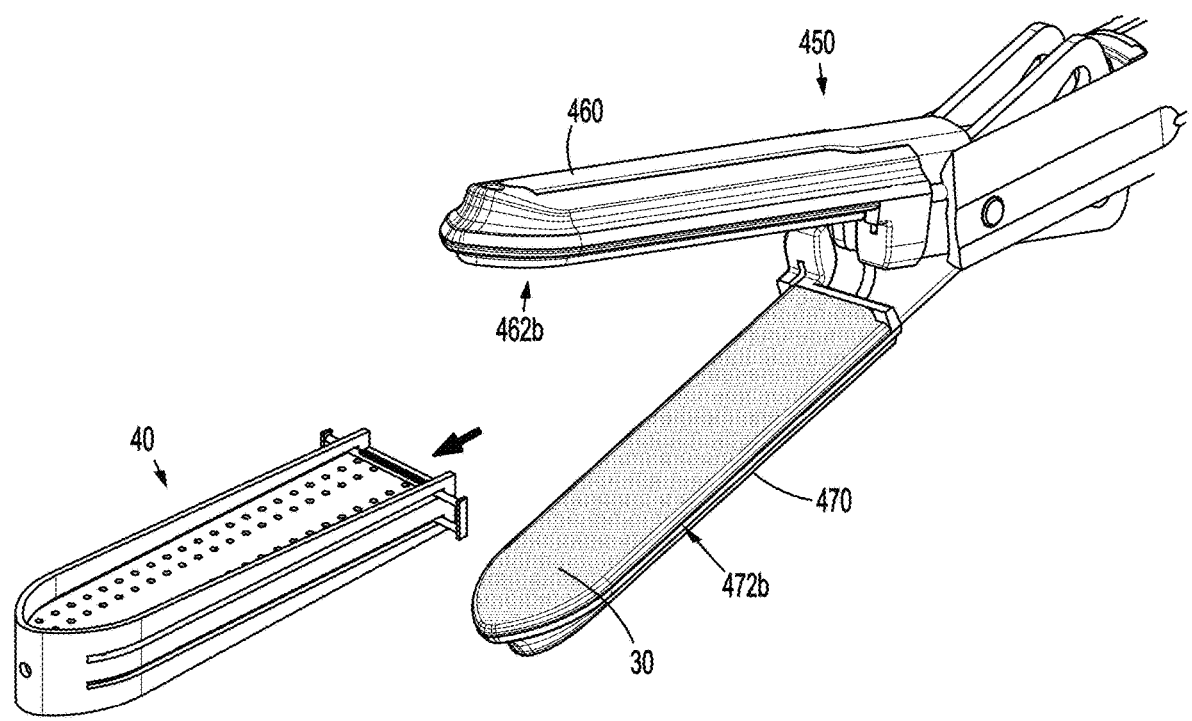
FIG. 13 is a perspective view of the jaws and the jaw applicator of FIG. 11, showing the jaws after application of a non-stick coating thereto.

Once the desired amount of non-stick coating material 30 is dispensed from the dispensing device 20, the dispensing device 20 is uncoupled from the jaw applicator 40 and the jaw applicator 40 is removed from between the jaws 460, 470. In some aspects, the dispensing device 20 and the jaw applicator 40 are simultaneously separated from the jaws 460, 470 as a unit. The jaw applicator 40 is released from the jaws 460, 470 by moving the jaws 460, 470 from the closed position to the open position. As seen in FIG. 13, tissue-engaging surfaces 462b, 472b of the jaws 460, 470 are now coated with the non-stick coating material 30. Once the non-stick coating material 30 has set (e.g., cured), the end effector 450 is ready for use. In some aspects, the non-stick coating material 30 is cured by heating the jaws 460, 470 (e.g., by applying electrosurgical energy to the jaws 460, 470).

In operation, with the jaws 460, 470 coated with the non-stick coating material 30, as described above, the forceps 100, 200 (FIGS. 1, 2) is used in accordance with methods known by those skilled in the art. If the tissue sealing surfaces 462b, 472b of the jaws 460, 470 become covered in eschar and/or other tissue byproducts due to electrosurgical treatment, the coating assembly 10 may be used to remove the eschar and/or to apply a new layer of the non-stick coating material 30 onto the jaws 460, 470, as described above.

Figure 14:
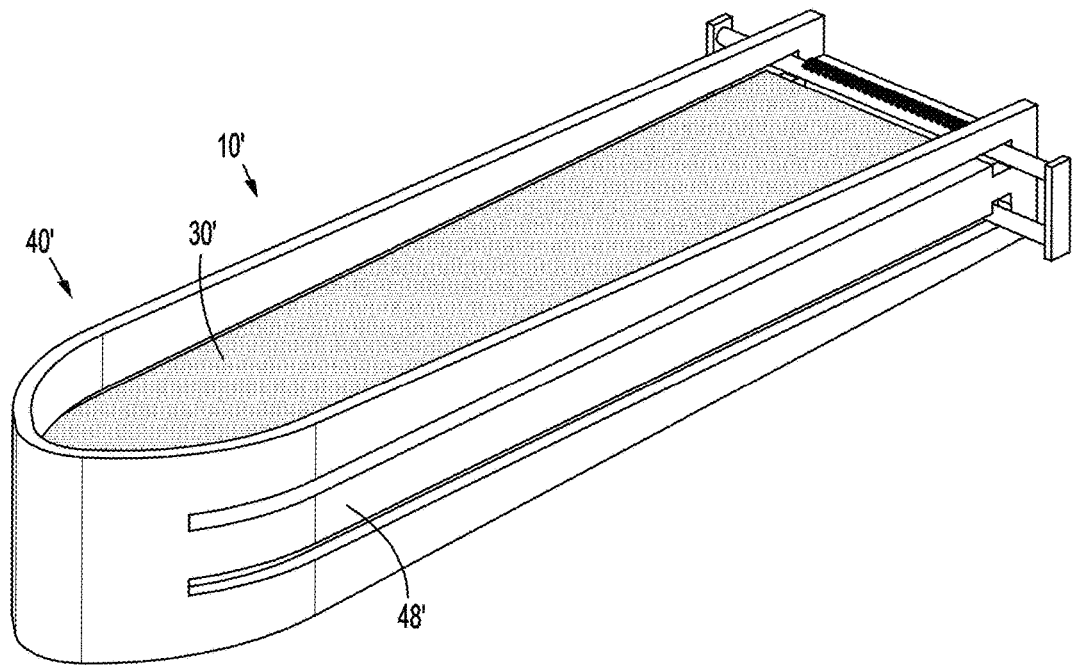
FIG. 14 is a perspective view of a coating assembly including a jaw applicator and layers of a non-stick coating in accordance with another aspect of this disclosure.

Turning now to FIG. 14, a coating assembly 10' in accordance with another aspect of this disclosure is shown. The coating assembly 10' includes a jaw applicator 40' and a non-stick coating material 30' pre-formed as layers on the outer surfaces 44b', 46b' (FIG. 16) of the first and second walls 44', 46' of the applicator body 42'. The jaw applicator 40' is substantially the same as the jaw applicator 40 (FIG. 5), except that the jaw applicator 40' is devoid of openings through the first and second walls 44', 46' and a connection hole through the side wall 48'. In aspects, the first and second walls 44', 46', as well as the side wall 48', are solid walls. The non-stick coating material 30' may be formed in films or sheets of a pre-determined thickness. The layers of the non-stick coating material 30' are pre-applied (e.g., during manufacturing) to jaw applicator 40'.

Figure 15:
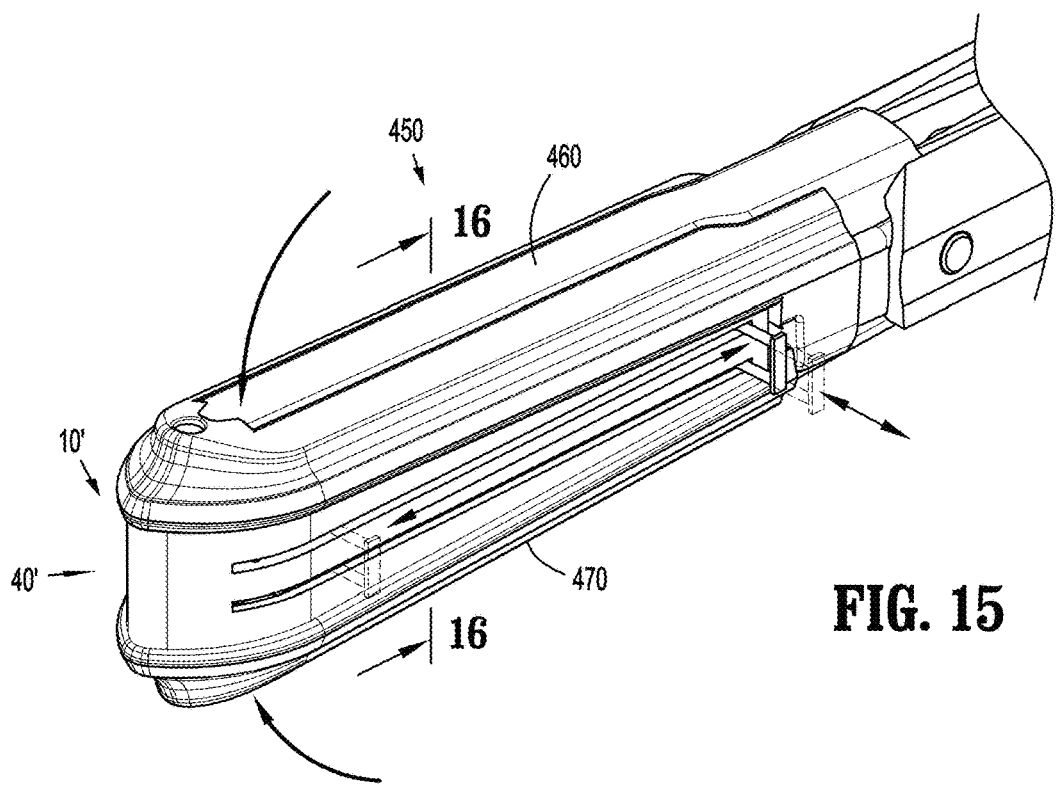
FIG. 15 is a perspective view of the coating assembly of FIG. 14 shown engaged with jaws of an end effector.
Figure 16:
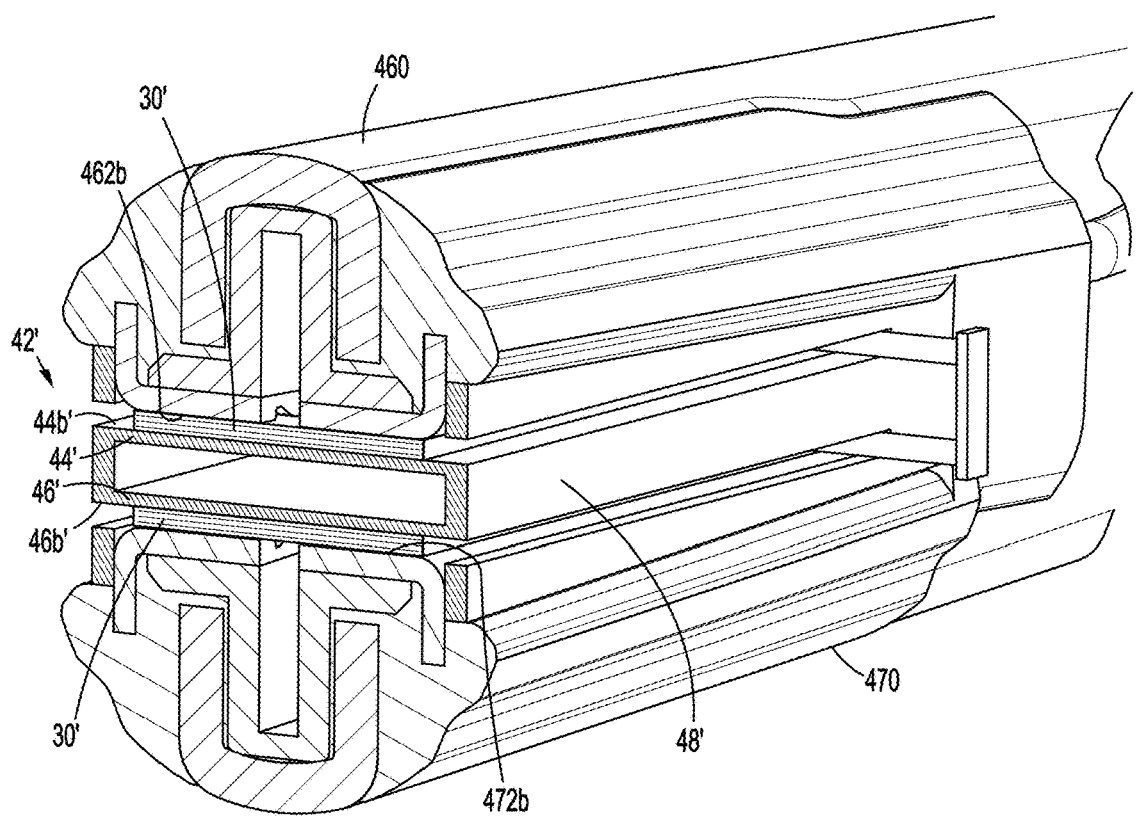
FIG. 16 is a cross-sectional view of the coating assembly and the jaws of FIG. 15, taken along section line 16-16 of FIG. 15.
Figure 17:
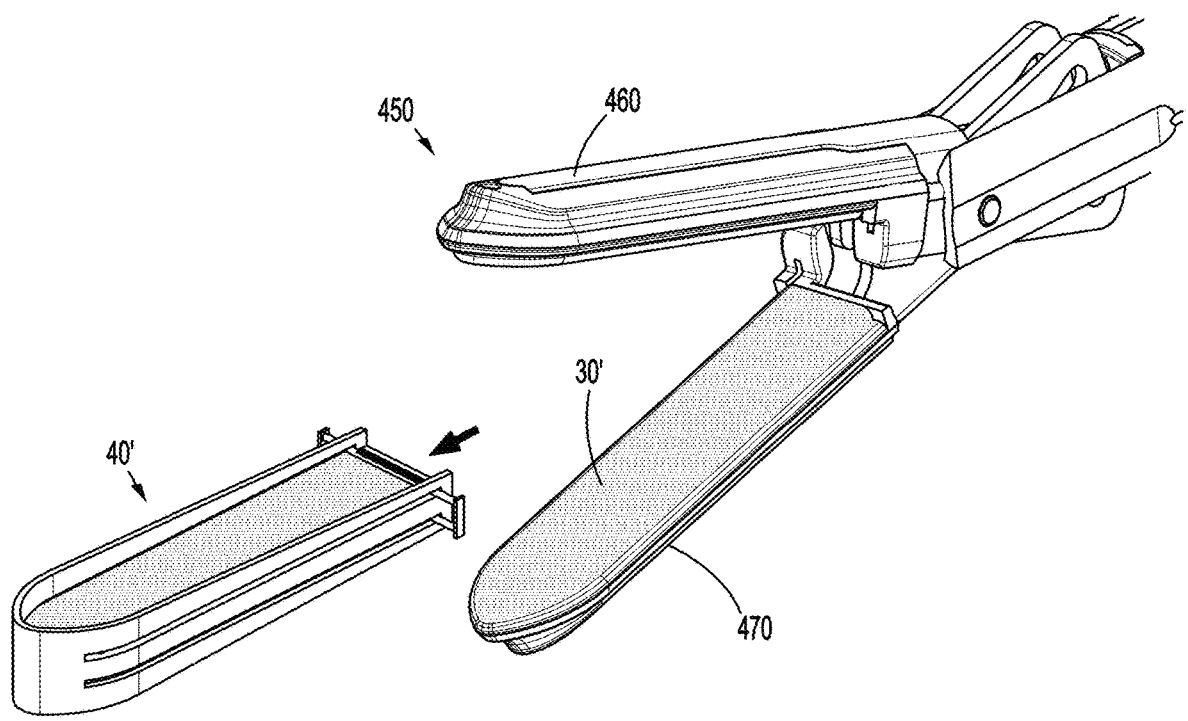
FIG. 17 is a perspective view of the coating assembly and the jaws of FIG. 15, showing the jaws after application of the layers of the non-stick coating thereto.

In a method of using the coating assembly 10', as seen in FIGS. 15-17, the jaw applicator 40', loaded with the layers of non-stick coating material 30', is positioned between the jaws 460, 470 of the end effector 450 and the jaws 460, 470 are moved from the open position to the closed position, as seen in FIG. 15. In the closed position, the tissue-engaging surfaces 462b, 472b of the jaws 460, 470 abut the non-stick coating material 30', as seen in FIG. 16. The forceps 100, 200 (FIG. 1, 2) to which the end effector 450 is secured, is then activated to heat the jaws 460, 470 to a pre-determined temperature for a pre-determined period of time so that the layers of the non-stick coating material 30' adhere to the jaws 460, 470. The jaws 460, 470 are then moved back to the open position and the jaw applicator 40' is removed, as seen in FIG. 17. The end effector 450, now loaded with the layers of coating material 30', is ready for use.

In aspects, the non-stick coating material may be combined with one or more additional coatings. For example, the additional coatings may be disposed directly on the tissue-engaging surfaces of the sealing plates prior to the application of the non-stick coating material such that the non-stick coating material is disposed on the additional coating and not directly on the tissue-engaging surface of the sealing plates. For a description of exemplary additional coatings, reference may be made to U.S. Pat. No. 10,368,939, the entire contents of which are incorporated herein by reference.

While the coatings are described herein as being non-stick coatings, it is envisioned that other types of coatings, e.g., for reducing tissue adhesion, improving grip, among providing other desired performance characteristics within the purview of those skilled in the art, may be applied to jaws utilizing the systems, assemblies, and methods of this disclosure.

While the systems, assemblies, and methods are illustrated and described as being utilized with handheld devices, it is contemplated and within the scope of this disclosure for the systems, assemblies, and methods to be used with end effectors that are detachably coupled to and controlled by a robotic surgical system, such as the robotic surgical system shown and described in U.S. Pat. No. 8,828,023, the entire contents of which are incorporated herein by reference.

While the assemblies, and methods are illustrated and described as being utilized with electrosurgical tissue sealing instruments, it should be understood that the assemblies and methods may be adapted for use with other surgical instruments including end effectors having jaws (e.g., mechanical forceps, surgical staplers, etc.) to which application of a coating material is desired.

While aspects of the disclosure have been shown in the drawings, it is not intended that the disclosure be limited thereto, as it is intended that the disclosure be as broad in scope as the art will allow and that the specification be read likewise. It is to be understood, therefore, that the disclosure is not limited to the precise aspects described, and that various other changes and modifications may be made by one skilled in the art without departing from the scope or spirit of the disclosure. Additionally, the elements and features shown and described in connection with certain aspects of the disclosure may be combined with the elements and features of certain other aspects without departing from the scope of the present disclosure, and that such modifications and variation are also included within the scope of the present disclosure. Therefore, the above description should not be construed as limiting, but merely as exemplifications of aspects of the disclosure. Thus, the scope of the disclosure should be determined by the appended claims and their legal equivalents, rather than by the examples given.

What is claimed is:

1. A coating assembly for coating jaws of an electrosurgical instrument, comprising:
    a dispensing device having a non-stick coating material contained therein and including a discharge port; and
    a jaw applicator including an applicator body defining a cavity therein, the applicator body including a first wall and a second wall disposed in spaced relation relative to each other and the cavity extending between the first wall and the second wall, each of the first and second walls having openings defined therethrough that are in open communication with the cavity,
    wherein the discharge port of the dispensing device is configured to engage the jaw applicator in a fluid tight manner to define a flow path for the non-stick coating material that extends out of the discharge port, into the cavity of the applicator body, and out of the openings defined in the first and second walls.

2. The coating assembly according to claim 1, wherein the applicator body includes a side wall interconnecting the first and second walls, the side wall extending around a first longitudinal side of the applicator body, a distal end portion of the applicator body, and a second longitudinal side of the applicator body.

3. The coating assembly according to claim 2, wherein the applicator body includes an end wall extending across a proximal end portion of the applicator body.

4. The coating assembly according to claim 2, wherein the cavity is further defined by the side wall, and the side wall includes a connection hole defined therethrough, the connection hole configured to receive the discharge port of the dispensing device therein.

5. The coating assembly according to claim 1, wherein the non-stick coating material includes hexamethyldisiloxane.

6. The coating assembly according to claim 1, wherein the jaw applicator further includes a brush assembly coupled to the applicator body.

7. The coating assembly according to claim 6, wherein the brush assembly includes a first brush and a second brush, the first brush disposed adjacent to an outer surface of the first wall and the second brush disposed adjacent to an outer surface of the second wall.

8. The coating assembly according to claim 7, wherein the first and second brushes are longitudinally slidable along the first and second walls.

9. A system for coating jaws of an electrosurgical instrument, the system comprising:
    the coating assembly of claim 1; and
    an end effector including a first jaw and a second jaw disposed in opposed relation to each other and movable between an open position and a closed position, each of the first and second jaws including a tissue-engaging surface,
    the end effector configured to engage the jaw applicator such that the tissue-engaging surfaces of the first and second jaws respectively face outer surfaces of the first and second walls of the applicator body such that the flow path for the non-stick coating material terminates at the tissue-engaging surfaces of the first and second jaws.

10. A coating assembly for coating jaws of an electrosurgical instrument, comprising:
    a jaw applicator including an applicator body extending along a central longitudinal axis and having a first wall and a second wall disposed in spaced relation relative to each other, each of the first and second walls including an inner surface, wherein the inner surfaces face one another, and an outer surface facing outwardly from opposed sides of the applicator body;
    a first layer of a non-stick coating material disposed on the outer surface of the first wall;
    a second layer of the non-stick coating material disposed on the outer surface of the second wall, and
    a first brush disposed adjacent to the outer surface of the first wall, wherein the first brush is longitudinally slidable along an axis parallel to the central longitudinal axis and along the outer surface of the first wall.

11. The coating assembly according to claim 10, wherein the applicator body includes a side wall interconnecting the first and second walls, the side wall extending around a first longitudinal side of the applicator body, a distal end portion of the applicator body, and a second longitudinal side of the applicator body.

12. The coating assembly according to claim 11, wherein the side wall extends outwardly beyond the outer surfaces of the first and second walls.

13. The coating assembly according to claim 10, wherein each of the first and second layers of the non-stick coating material includes hexamethyldisiloxane.

14. The coating assembly according to claim 10, wherein the jaw applicator further includes a brush assembly coupled to the applicator body, the brush assembly including the first brush.

15. The coating assembly according to claim 14, wherein the brush assembly includes a second brush, the second brush disposed adjacent to the outer surface of the second wall.

16. The coating assembly according to claim 15, wherein the second brush is longitudinally slidable along the second wall.

17. A system for coating jaws of an electrosurgical instrument, the system comprising:
    the coating assembly of claim 10; and
    an end effector including a first jaw and a second jaw disposed in opposed relation to each other and movable between an open position and a closed position, each of the first and second jaws including a tissue-engaging surface,
    the end effector configured to engage the jaw applicator such that the tissue-engaging surfaces of the first and second jaws respectively contact the first and second layers of the non-stick coating material disposed on the outer surfaces of the first and second walls of the applicator body.

* * * * *